United States Patent [19]

Gulczynski

[11] Patent Number: 5,270,904
[45] Date of Patent: Dec. 14, 1993

[54] SWITCHING POWER APPARATUS WITH 3-STATE DRIVER

[76] Inventor: Zdzislaw Gulczynski, P.O. Box 11633, Costa Mesa, Calif. 92627

[21] Appl. No.: 517,853

[22] Filed: May 2, 1990

[51] Int. Cl.$^5$ .................................. H02M 7/5387
[52] U.S. Cl. ........................... 363/97; 363/98; 363/132; 363/134
[58] Field of Search ............. 363/17, 24, 25, 26, 363/97, 98, 132, 134

[56] References Cited

U.S. PATENT DOCUMENTS

| | | | |
|---|---|---|---|
| 4,241,243 | 12/1980 | Ball | 323/8 |
| 4,307,441 | 12/1981 | Bello | 363/25 |
| 4,476,441 | 10/1984 | Gulczynski | 330/262 |
| 4,736,286 | 4/1988 | Gulczynski | 363/70 |
| 4,794,508 | 12/1988 | Carroll | 363/97 |
| 4,803,610 | 2/1989 | Gulczynski | 363/70 |
| 4,845,391 | 7/1989 | Gulczynski | 307/631 |
| 4,853,837 | 8/1989 | Gulczynski | 363/80 |
| 4,871,980 | 10/1989 | Gulczynski | 330/295 |
| 4,940,906 | 7/1990 | Gulczynski | 307/296.1 |
| 4,947,308 | 8/1990 | Gulczynski | 363/97 |

Primary Examiner—Steven L. Stephan
Assistant Examiner—Jeffrey Sterrett

[57] ABSTRACT

The switching power apparatus has high efficiency, high reliability and very small number of components. A power transformer is used if line isolation is necessary. The apparatus is operable with almost any configuration comprising at least one bidirectional or two unidirectional switches for producing AC or DC outupt signal. The switching is minimized with increasing output signal level as to maximize the efficiency but with no significant deterioration of the harmonic distortion level.

A resistor divider provides two feedback signals in response to the output signal. Two comparators compare the input signal against the feedback signals and provide two comparison signals. Two flip-flops temporarily store the comparison signals. A switching amplifier provides the output signal in response to the comparison signals stored in the flip-flops. If output signal correction is unnecessary, the switching amplifier is in idle state.

11 Claims, 2 Drawing Sheets

SWITCHING POWER APPARATUS WITH 3-STATE DRIVER

CROSS REFERENCE TO RELATED INVENTIONS

This invention is related to the following inventions by the same inventor:

"Switching Power Apparatus Having High Power Factor and Comprising Pair of Converters for Obtaining Fixed or Variable Output Voltage" Ser. No. 665,950 filed Mar. 11, 1991;

"Ultra Efficient Resonant Switching Power Apparatus" Ser. No. 632,546 filed Dec. 24, 1990;

"Bidirectional Switching Power Apparatus with AC or DC Output" U.S. Pat. No. 5,057,990 dated Oct. 15, 1991;

"Capacitive Load Driver with Binary Output" Ser. No. 474,488 filed Feb. 2, 1990;

"3-Terminal Bidirectional Switching Power Supply with AC or DC Input and AC or DC Output" Ser. No. 444,729 filed Dec. 1, 1989;

"Switching Power Supply with Constant or Sinusoidal Input Current and with Fixed or Variable Output Voltage" Ser. No. 444,730 filed Dec. 1, 1989;

"Switching Power Supply with Constant or Sinusoidal Input Current" Ser. No. 393,391 filed Aug. 14, 1989;

"Switching Power Supply Comprising Pair of Converters for Obtaining Constant or Sinusoidal Input Current and Fixed or Variable Output Voltage" U.S. Pat. No. 4,999,568 dated Mar. 12, 1991;

"Ultra Efficient Switching Power Amplifier" U.S. Pat. No. 4,980,649 dated Dec. 25, 1990;

"Synchronous Switching Power Supply Comprising Buck Converter" Ser. No. 363,325 filed Jun. 8, 1989;

"Synchronous Switching Power Supply Comprising Boost or Flyback Converter" Ser. No. 363,326 filed Jun. 8, 1989;

"Synchronous Switching Power Supply with Boost and/or Flyback Converters" Ser. No. 363,327 filed Jun. 8, 1989;

"High Power Switching Power Supply" U.S. Pat. No. 4,947,308 dated Aug. 7, 1990;

"High Efficiency Power Factor Correction Circuit" U.S. Pat. No. 4,949,234 dated Aug. 14, 1990;

"High Power Switching Power Supply with High Power Factor" Ser. No. 304,508 filed Jan. 31, 1989;

"High Power Switching Power Supply Having High Power Factor" U.S. Pat. No. 4,956,760 dated Sep. 11, 1990;

"Power Switch Driver" U.S. Pat. No. 4,940,906 dated Jul. 10, 1990;

"Synchronous Switching Power Supply with Flyback Converter" U.S. Pat. No. 4,853,837 dated Aug. 1, 1989;

"High Efficiency Power Amplifier Comprising Multilevel Power Supply" U.S. Pat. No. 4,871,980 dated Oct. 3, 1989;

"Switching Power Amplifier" U.S. Pat. No. 4,763,080 dated Aug. 9, 1988;

"Switching Circuits Performing Thyristor and Triac Functions" U.S. Pat. No. 4,845,391 dated Jul. 4, 1989;

"Switching Power Supply" U.S. Pat. No. 4,803,610 dated Feb. 7, 1989;

"Switching Power Supply" U.S. Pat. No. 4,736,286 dated Apr. 5, 1988; and

"Push-Pull Power Amplifier" U.S. Pat. No. 4,476,441 dated Oct. 9, 1984.

BACKGROUND OF THE INVENTION

The invention relates to switching power apparatus, particularly for power supply systems providing an AC or DC output signal. The apparatus has high efficiency, high reliability and very small number of components. A power transformer is used if line isolation is necessary. The apparatus can be employed in a switching power supply (SPS), switching power amplifier, uninterruptible power supply (UPS), programmable converter, line conditioner, AC voltage converter, frequency converter, etc.

Power amplifiers are devices designed to amplify an input signal and provide an undistorted output signal which is independent of supply voltages, load fluctuations over frequency, operating temperature, etc. In particular, switching power amplifiers provide significantly higher efficiency by employing high speed switches. They are often used to provide signal having a fixed frequency, as in UPS system, frequency converter, etc.

Conventional SPSs with AC output, i.e. switching power amplifiers, perform multiple conversions. The line voltage is rectified. The rectified voltage is stored in one or two capacitors. In one type of the SPSs, the capacitor voltages are converted into low frequency signal which has the desired waveform. A transformation is performed which however is inefficient for low frequencies. The transformer has to be designed for high inductance and is relatively of large size and heavy weight. This does not correspond to modern electronic construction which is usually of high packing density with reasonable weight. In another type of the SPSs, the capacitor voltages are converted into high frequency AC signal which is transformed. Output signal of the transformer is rectified and voltages of opposite polarities are stored in two capacitors. These voltages are converted into the AC output signal which has the desired waveform. The SPSs employ the isolation transformers whether or not line isolation is required.

The disadvantages of conventional switching power amplifiers are many. The input signal, e.g. audio, is usually converted into a specific pulse width modulated signal (PWM) which is a combination of analog and digital signals. The pulse width can have any value within a switching period and is influenced by all kinds of errors. Each of the complementary output transistors must switch at least once within the high frequency period. A poor tracking of the transistor switching times results in asymmetric errors in pulse width. Power supply ripples and pulse amplitude errors depend on output power which increases distortion level, particularly near crossover point. Pulses are lost near extremes of modulation. A dead time of the transistors is inevitable in order to prevent overlapping of the conduction phases thereof due to drive asymmetry, poor transistor recovery characteristics or inadequate deadband of a control circuitry.

Furthermore, the output filter in resonant configuration is designed for one specific frequency. Its performance is poor due to regulation concepts, such as the PWM, rather than practical limitations of the components. A very high switching frequency is necessary, mostly tens of times higher than a maximum frequency of the amplified signal. This results in a further reduced efficiency and a relatively high distortion level due to the limited switching performance of the power switches. Another unsolved problem is a desirable load having a relatively stable impedance over frequency. The equivalent switching frequency of the individual transistors is actually significantly higher as the switching times thereof are a fraction of the switching period. An SPS for stabilizing supply voltages is common. This further increases the complexity and in most cases generates a huge amount of EMI/RFI, especially into the line. Numerous interference suppressors and protection circuits ar inevitable.

Harmonic distortion level is defined as 100% times the ratio of the RMS sum of the harmonics to the fundamental. Therefore, the harmonic distortion level is inversely proportional to the fundamental. Output currents of the output switches of the switching power amplifier usually increase with increasing output voltage. Therefore, it is desirable to minimize the switching of the output switches with increasing output voltage level as to maximize the amplifier efficiency but with no significant deterioration of the harmonic distortion level.

SUMMARY OF THE INVENTION

The present invention is intended to provide a switching power apparatus having high efficiency, high reliability and very small number of components. A power transformer is eliminated if line isolation is unnecessary in order to minimize EMI, RFI, power loss, size, weight, cost, etc. The apparatus is operable with almost any configuration, e.g. half bridge and full bridge converters, comprising at least one bidirectional or two unidirectional switches for producing an AC or DC output signal. In particular, the apparatus can drive a pair of unidirectional or bidirectional switches which deliver a high frequency square wave signal to an LC-network. The efficiency is further increased by adequately operating the switches.

Switching power apparatus according to the present invention provides output signal in response to input signal and comprises: a resistive means for providing a pair of feedback signals in response to the output signal; a pair of comparator means for comparing the input signal against the feedback signals and providing a pair of comparison signals; a register means for interim storage of the comparison signals; and an amplifier means for providing the output signal in response to the comparison signals stored in the register means.

The amplifier means includes: an inductive means for providing the output signal; a voltage source means for providing one or two supply voltages; and a pair of switching means each for selectively coupling the inductive means to the voltage source means in response to the comparison signals stored in the register means. Each switching means includes a nonlinear means for receiving the comparison signals stored in the register means, wherein one of the nonlinear means is enabled while the other nonlinear means is disabled.

In another embodiment at least one switching means includes: a second resistive means for providing a voltage in response to an excessive current conducted by the switching means; and a monoflop means for disabling the switching means in response to the second resistive means voltage.

BRIEF DESCRIPTION OF THE DRAWINGS

The present invention will become more clear in conjunction with the accompanying figures of which.

DETAILED DESCRIPTION OF THE INVENTION

Figure 1:
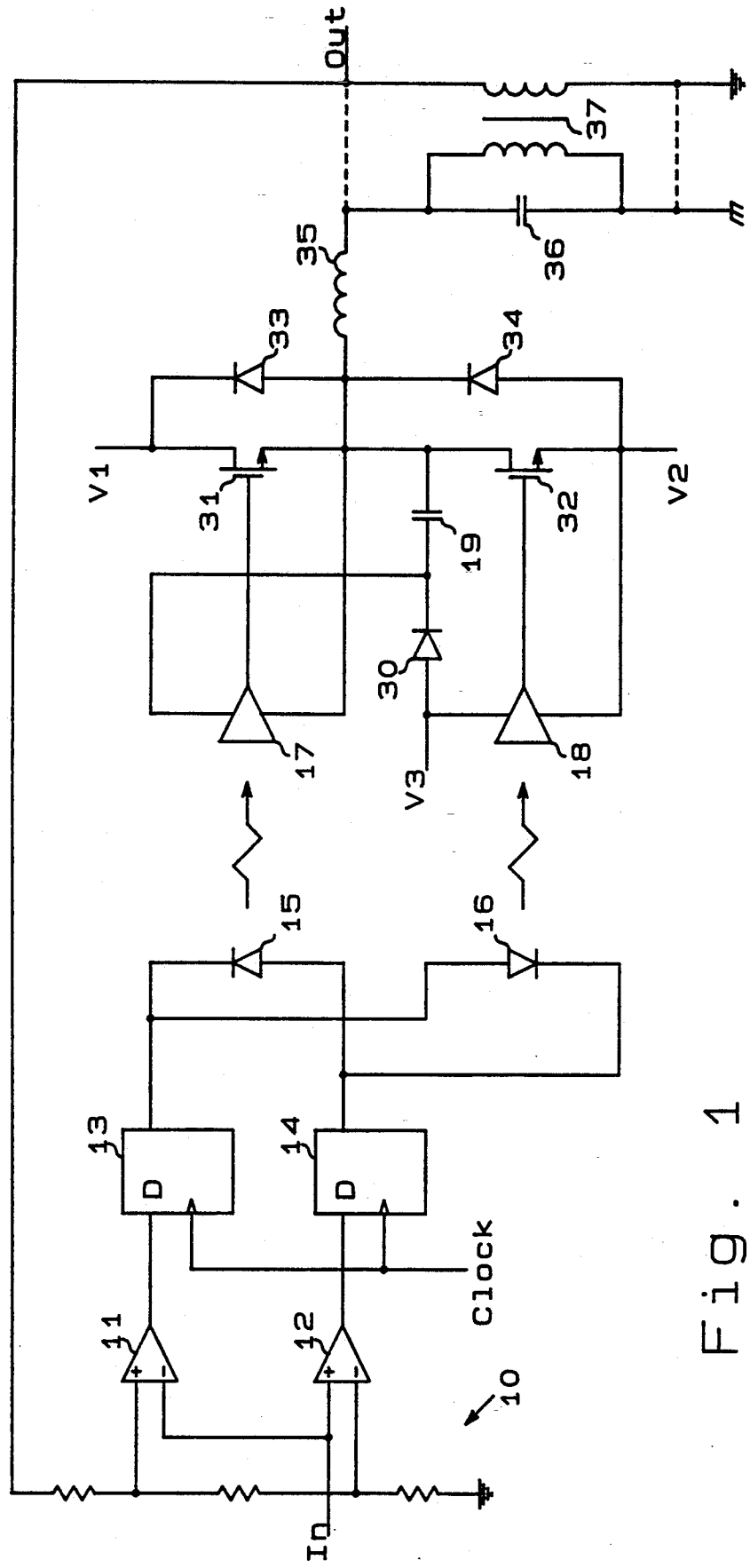
FIG. 1 is the embodiment of the switching power apparatus. Transformer is employed if line isolation is necessary.

FIG. 1 is the embodiment of the switching power apparatus. The resistor divider 10 provides a pair of feedback voltages in response to the output voltage. The comparators 11 and 12 compare the input voltage against the feedback voltages and provide a pair of binary comparison signals. A register means comprises the D-type flip-flops 13 and 14 for interim storage of the comparison signals. An amplifier means comprises the components 15 thru 19 and 30 thru 37 for providing the output voltage in response to the comparison signals stored in the register means.

The resistor divider 10 consists of three resistors coupled in series between the output and ground. The divider 10 provides a pair of the feedback voltages equal to $aV$ and $bV$, where $a$ is greater than $b$ and $V$ is a momentary value of the output voltage. The feedback voltage $aV$ is applied to the noninverting input of the comparator 11. The feedback voltage $bV$ is applied to the inverting input of the comparator 12. The input voltage is applied to the inverting input of the comparator 11 and noninverting input of the comparator 12.

The ideal value of the output voltage is $kE$, where $k$ is the desired gain of the apparatus and $E$ is the momentary value of the input voltage. Obviously, an accuracy error of the output voltage is inevitable, particularly due to the switching nature of the apparatus. Moreover, the accuracy error is intentionally increased with increasing level of the output voltage as to minimize the switching of the amplifier means and thus maximize the efficiency of the apparatus, but with no significant deterioration of the harmonic distortion level.

The feedback voltages $aV$ and $bV$ set threshold levels of the comparators 11 and 12 respectively. The average value of the feedback voltages is equal to $E$, whereby $a+b=2/k$. The accuracy error is equal to $(a-b)kE$. By these means, the resistor values of the divider 10 can be determined. The accuracy error is proportional to the input voltage and can be adjusted by the resistor coupled between the noninverting input of the comparator 11 and inverting input of the comparator 12. The accuracy error is substantially equal zero near crossover point. Moreover, it determines harmonic distortion level and recurrence of idle state of the amplifier means where the efficiency of the apparatus is near 100%. The resistor divider 10 may include nonlinear components in order to obtain a specific transfer characteristic of the apparatus.

The D-type flip-flops 13 and 14 perform the interim storage of the binary comparison signals produced by the comparators 11 and 12 respectively. The flip-flops 13 and 14 are positive edge-triggered. Thereby, the respective comparison signals at the D inputs are transferred on the positive edge of the clock signal to the outputs of the flip-flops 13 and 14. The frequency of the clock signal is significantly higher than frequency of the input voltage of the apparatus. The clock frequency can be altered with varying frequency of the input voltage in order to maximize efficiency of the apparatus. Moreover, the clock frequency can be increased with decreasing output voltage level in order to further minimize distortion level, particularly near crossover point. The comparison signals stored in the flip-flops 13 and 14 are combined as to drive each switching means of the amplifier means.

Specifically, the photodiode 15 and driver 17 are optically coupled. Similarly, the photodiode 16 and driver 18 are optically coupled. The photodiodes 15 and 16 are coupled to the outputs of the flip-flops 13 and 14 respectively, wherein anode of each one photodiode is coupled to the cathode of the other photodiode. This antiparallel coupling provides for limited reverse voltages across the photodiodes 15 and 16. Generally, the photodiodes 15 and 16 can be replaced with other nonlinear components, particularly when line isolation is unnecessary. For instance, a pair of transistors having antiparallel coupled base and emitter electrodes can be used for receiving the comparison signals stored in the flip-flops 13 and 14. In any case, one of the components is enabled while the other component is disabled.

When the input voltage E is higher than the feedback voltage aV, the comparison signals produced by the comparators 11 and 12 are low and high respectively. Therefore, after the next positive edge of the clock signal, the signals stored in the flip-flops 13 and 14 are low and high respectively, regardless of binary values previously stored therein. The photodiode 15 is forward biased and emits light, whereby the output of the driver 17 is high. The photodiode 16 is reverse biased, whereby the output of the driver 18 is low.

When the input voltage E is lower than the feedback voltage bV, the comparison signals produced by the comparators 11 and 12 are high and low respectively. Therefore, after the next positive edge of the clock signal, the signals stored in the flip-flops 13 and 14 are high and low respectively, regardless of binary values previously stored therein. The photodiode 15 is reverse biased, whereby the output of the driver 17 is low. The photodiode 16 is forward biased and emits light, whereby the output of the driver 18 is high.

When the input voltage E is lower and higher than the feedback voltages aV and bV respectively, the comparison signals produced by the comparators 11 and 12 are both high. After the next positive edge of the clock signal, the signals stored in the flip-flops 13 and 14 are both high. Similarly, when E is higher and lower than aV and bV respectively, the comparison signals produced by the comparators 11 and 12 are both low. After the next positive edge of the clock signal, the signals stored in the flip-flops 13 and 14 are both low. In either case, the signals applied to the photodiodes 15 and 16 are substantially equal zero and outputs of both drivers 17 and 18 are low.

The components 10 thru 18 constitute a 3-state driver circuit having a pair of outputs for driving output transistors. The outputs can never be both high, regardless of accuracy errors of the comparators 11 and 12, noise, parasitic oscillations, etc. Only one output is high or both outputs are low. The latter results in the idle state of the amplifier means. This is distinctively advantageous over the PWM and similar techniques where output transistors are switched whether or not such switching makes sense.

The amplifier means further includes a voltage source means for providing two supply voltages V1 and V2, or one supply voltage if either V1 or V2 is equal to zero. Two switching means selectively couple the inductor 35 to the voltage source means in response to the comparison signals stored in the register means. Specifically, one switching means comprises the photodiode 15 and driver 17, and further the N-channel MOSFET 31 and diode 33. Similarly, the other switching means comprises the photodiode 16 and driver 18, and further the N-channel MOSFET 32 and diode 34. The source of the transistor 31 and drain of transistor 32 are coupled to the inductor 35. The diodes 33 and 34 are coupled in parallel with the transistors 31 and 32 respectively for limiting reverse voltages thereacross. The diodes 33 and 34 may be "parasitic" drain-source diodes inherent in most power MOSFETs.

The inductor 35 provides the output voltage of the apparatus. The capacitor 36 is coupled to ground for storing the output voltage. The capacitor 36 may be also a portion of the load.

When the output of the driver 17 is high, the transistor 31 is turned on. V1 is applied to the inductor 35, whereby the output voltage is increased. Similarly, when the output of the driver 18 is high, the transistor 32 is turned on. V2 is applied to the inductor 35, whereby the output voltage is decreased. When the outputs of both drivers 17 and 18 are low, both transistors 31 and 32 are turned off. If the current of the inductor 35 is zero so is the voltage thereacross. Otherwise, one of the diodes 33 or 34 conducts the inductor current according to the polarity thereof.

The transformer 37 is used if line isolation is necessary. The transformer 37 can be coupled directly to the transistors 31 and 32, whereby the apparatus provides a square wave output voltage. An average value of the output voltage can be obtained simply by coupling a capacitor between the noninverting input of the comparator 11 and ground. The inductor 35 can be coupled in series with the primary of the transformer 37 for attaining a current. By this means, the transformer 37 is current rather than voltage driven. Furthermore, the capacitor 36 can be added for storing a voltage in response to the current of the inductor 35. The voltage appearing across the capacitor 36 is applied across the primary of the transformer 37 whose secondary provides the output voltage. The transformer 37 is optional as illustrated by the dashed lines, wherein the primary and secondary can be coupled to separate grounds. In any case, the inductor 35 and capacitor 36 operate as a low-pass filter or time constant network since the result is a corrective noise voltage superimposed onto the output voltage of the apparatus.

The supply voltages V1 and V2 may be stored in large capacitors which are charged by a diode bridge, power factor correction circuit, etc. The driver 18 is supplied from a third supply voltage V3 which is referenced to V2. This can be accomplished by means of a low power regulator which is referenced to V2. The capacitor 19 stores supply voltage for the driver 17 and is charged intermittently. This minimizes parasitic capacitances which affect turn-on and turn-off times of the transistors 31 and 32. The driver 17 and capacitor 19 are referenced to the source of the transistor 31. The diode 30 is coupled between V3 and capacitor 19. The capacitor 19 is charged whenever the transistor 32 is turned on. Consequently, when the transistor 31 is turned on, the gate voltage thereof is higher than V1.

Amplifier means having another configuration can be employed, e.g. as disclosed in the aforementioned "Bidirectional Switching Power Apparatus with AC or DC Output" filed on even date herewith, "3-Terminal Bidirectional Switching Power Supply with AC or DC Input and AC or DC Output" application Ser. No. 444,729 filed 12/01/89, "Ultra Efficient Switching Power Amplifier" U.S. Pat. No. 4,980,649 dated Dec. 25, 1990, "Switching Power Amplifier" U.S. Pat. No. 4,763,080 dated 08/09/88 and "Switching Power Supply" U.S. Pat. No. 4,803,610 dated 02/07/89, all by the same inventor.

Some of those amplifiers operate with AC rather than DC supply voltages. Consequently, the supply voltages V1 and V2 may be AC, wherein the switching means may be unidirectional or bidirectional. For instance, a transformer may have secondary winding with center tap coupled to ground as to provide V1 and V2. The outputs of the drivers 17 and 18 determine required polarity of the corrective output current. Therefore, a pair of XOR gates is necessary for inverting the comparison signals applied to or stored in the flip-flops 13 and 14, in response to V1 or V2. A synchronization of the clock signal with V1 or V2 is necessary. If this is too difficult, an additional comparator coupled to XOR gate inputs can be used for determining the polarity of V1 and thus V2.

Figure 2:
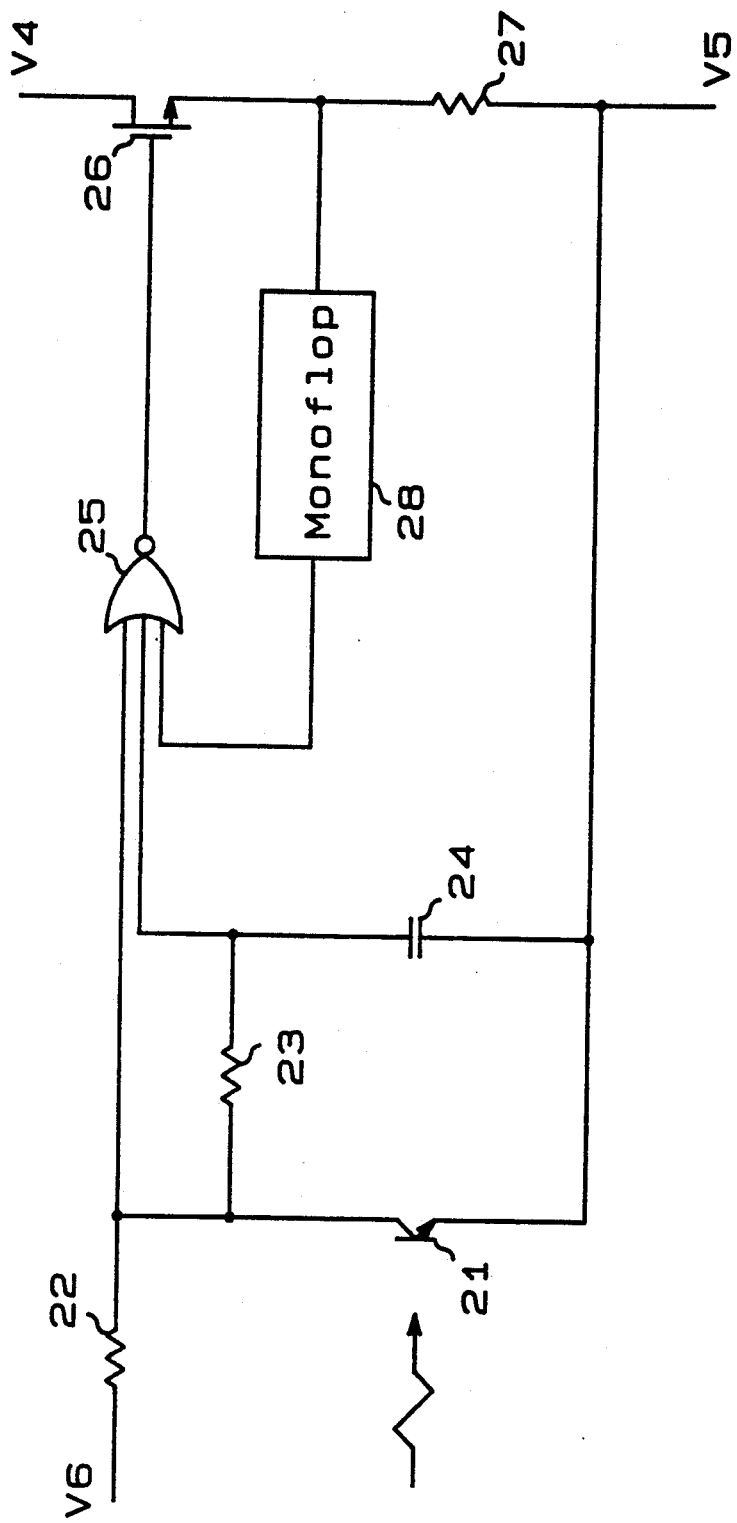
FIG. 2 is an embodiment of the driver with optical receiver and providing for protection against overlapping of conduction phases and for short circuit protection. The output transistor is also shown.

FIG. 2 is an embodiment of the driver with optical receiver and providing for protection against overlapping of conduction phases and for short circuit protection. The supply voltage of the driver is applied between V5 and V6, wherein all voltages are referenced to V5. In reference to the FIG. 1 embodiment, the driver can be substituted for the driver 17, wherein the N-channel MOSFET 26 corresponds to the transistor 31. Consequently, the photodiode 15 and phototransistor 21 constitute an optocoupler. V4 is coupled to V1, and V5 and V6 are coupled across the capacitor 19. Similarly, the driver can be substituted for the driver 18, wherein the transistor 26 corresponds to the transistor 32. The photodiode 16 and phototransistor 21 constitute an optocoupler. V4, V5 and V6 are coupled to the source of transistor 31, V2 and V3 respectively.

The NOR gate 25 drives the transistor 26 and has three inputs separately coupled to the collector of the phototransistor 21, output of an RC-network and output of monoflop 28. The RC-network consists of the resistor 23 and capacitor 24. The voltage thereacross is delayed with reference to the voltage appearing at the collector of the phototransistor 21. The delay time is determined mainly by the values of the resistor 23 and capacitor 24. If the phototransistor 21 is deactivated, the pull-up resistor 22 sets the collector voltage high. Therefore, the switching of the output of the gate 25 from high to low is not affected by the delay of the RC-network.

If the phototransistor 21 is exposed to light, the collector voltage is switched from high to low. However, the voltage across the capacitor 24 remains high for some period of time. Subsequently, the output of the gate 25 goes high and transistor 26 turns on. The delay of the RC-network protects output transistors, such as 31 and 32 of FIG. 1, against overlapping of conduction phases. In particular, turn-off delay time of the transistor being turned off is considered. The phototransistor 21 is activated by the respective photodiode so that the delay of the RC-network is caused in response to the comparison signals stored in the register means. For instance, the phototransistor 21 may be optically coupled to the photodiode 15 which is responsive to both comparison signals stored in the flip-flops 13 and 14, as of FIG. 1.

Short circuit protection is accomplished by direct sensing of the current conducted by the transistor 26. Specifically, the resistor 27 is coupled in series with the source of the transistor 26. An excessive drain current of the transistor 26 results in a voltage across the resistor 27 so that the monoflop 28 is triggered. The monoflop 28 generates a positive pulse which immediately sets output of the gate 25 low, whereby the transistor 26 is cut off. When the pulse ends and the overload condition still exists, the excessive drain current builds up and the monoflop 28 is triggered again. Additional inputs of the gate 25 and/or monoflop 28 can be provided for a circuit detecting other abnormal operating conditions such as excessive temperature.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power apparatus providing output signal in response to input signal, comprising:
   a resistive means for providing a pair of feedback signals in response to the output signal;
   a pair of comparator means for comparing the input signal against the feedback signals and providing a pair of comparison signals;
   a register means for interim storage of the comparison signals; and
   an amplifier means for providing the output signal in response to the comparison signals stored in the register means.

2. Switching power apparatus of claim 1 wherein the amplifier means includes an inductive means for providing the output signal.

3. Switching power apparatus of claim 2 wherein the amplifier means includes:
   a voltage source means for providing one or two supply voltages; and
   a pair of switching means each for selectively coupling the inductive means to the voltage source means in response to the comparison signals stored in the register means.

4. Switching power apparatus of claim 3 wherein each switching means includes a nonlinear means for receiving the comparison signals stored in the register means, and
   further wherein one of the nonlinear means is enabled while the other nonlinear means is disabled.

5. Switching power apparatus of claim 3 wherein each switching means includes a transistor and diode coupled in parallel therewith.

6. Switching power apparatus of claim 3 wherein at least one switching means includes a means for causing a delay in response to the comparison signals stored in the register means.

7. Switching power apparatus of claim 3 wherein at least one switching means includes:
   a second resistive means for providing a voltage in response to an excessive current conducted by the switching means; and
   a monoflop means for disabling the switching means in response to the second resistive means voltage.

8. Switching power apparatus of claim 2 wherein the inductive means includes a transformer.

9. Switching power apparatus of claim 2 wherein the amplifier means includes a capacitive means for storing the output signal.

10. Switching power apparatus of claim 2 wherein the amplifier means includes a second inductive means coupled in series with said first inductive means for attaining a current.

11. Switching power apparatus of claim 10 wherein the amplifier means includes a capacitive means for storing a voltage in response to the current, and further wherein said first inductive means is responsive to the voltage.

* * * * *